Dec. 11, 1951  J. D. GILES ET AL  2,578,534
SEPARATOR FOR ELECTRIC STORAGE BATTERIES
Original Filed Jan. 6, 1945
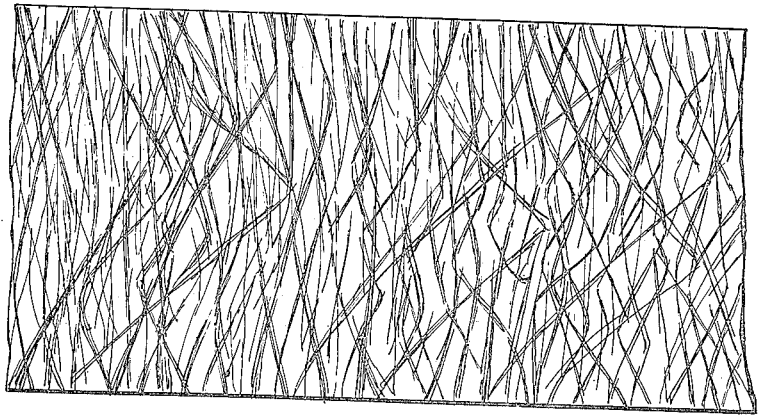
DIRECTION OF TRAVEL
INVENTORS
Jeremiah D. Giles
BY  Roy J. Scott
ATTORNEY Patented Dec. 11, 1951

2,578,534

UNITED STATES PATENT OFFICE 2,578,534

SEPARATOR FOR ELECTRIC STORAGE BATTERIES

Jeremiah D. Giles, Litchfield, Conn., and Roy J. Scott, Beverly Hills, Calif., assignors, by mesne assignments, to Tilo Roofing Company, Inc., a corporation of Delaware Original application January 6, 1945, Serial No. 571,688. Divided and this application August 20, 1949, Serial No. 111,544

5 Claims. (Cl. 136—146)

This application relates to a battery separator made of glass fibers and is a division of our earlier application Serial No. 571,688, filed January 6, 1945, now abandoned.

The subject-matter of the present invention is a battery separator consisting of matted glass fibers, the larger proportion of which have a length at least equal to the smaller lateral dimension of the separator. The fibers are bonded together with a water-insoluble binder which connects the fibers at points of contact but the separator is sufficiently free of films filling the spaces between the fibers, so that the separator has a porosity of between 60% and 92%. The fibers have a sufficiently uniform general direction so that the separator shows a distinct grain and preferably should have about twice as much resistance when flexed on one transverse axis as when flexed on the other transverse axis.

A separator which is the subject-matter of this invention can be made in the following manner:

Glass fibers are drawn from a molten mass preferably in parallel groups and these groups are laid down on a rapidly rotating drum so that the mass on the drum is made up of layers, with the fibers in each layer parallel and consisting of a number of thicknesses and with the layers crossing each other at a slight angle. After enough of the glass is wound on the drum, it is cut across the face of the drum in a known manner and expanded by pulling in a direction approximately at right angles to the original position of the fibers. This causes the fibers to assume a tangled position but the average of them will run with sufficient uniformity so that the sheet will have a distinct grain. The fibers are bonded together by spraying a liquid bonding material, such as a synthetic resin, onto the mass of fibers, or submerging it in a bath of the binder. Preferably excess binder is withdrawn from the sheet by passing it over a suction box which draws out most of the binder except that necessary to lock together the fibers at points of intersection.

We have found that the most advantageous types of adhesives to use are selected from the various plastics now available in the market. These plastics fall in two general classes: The thermoplastic type and the thermosetting type. Either type can be obtained in liquid form (as a solution or emulsion) and therefore various types of plastic can be used in our process to give a product having a binder that is substantially water-insoluble.

After the excess plastic or adhesive is removed from the sheet, the latter is taken to an appropriate drier. If a thermoplastic material is used in the form of a true solution, all that need be done in the drier is to remove solvents. On the other hand, if a water emulsion is employed, the temperature should reach the point where the dispersed particles of the plastic will coalesce. If a thermosetting resin is used, the temperature must be sufficient to dry out the liquefying agent and then to harden the residual resin.

For the purposes of illustration we show in the accompanying drawing a sheet of material made in accordance with the above process. The battery separator of our invention is simply a portion of this sheet cut to appropriate size.

It will be remembered that the original glass supplied to the expanding mechanism is a relatively thick layer of glass fibers which run more or less parallel. When the expansion takes place, the average arrangement of the strands throughout the sheet may appear to be fairly uniform but the localized arrangement is not uniform. It will be found that over portions of their length small bundles of fibers cling together and where these bundles remain, they will run at more or less regular diagonals which cross each other at an angle which is ordinarily more than 45° from the main axis of the web. The individual fibers branching over and interconnecting these groups remain much more closely in their original position, that is, running directly transverse the axis of the web. This structure is indicated in the drawing. This effect is particularly noticeable when the sheet has been bonded together with a resinous material having color, for the resin will principally cling to the points where the little bundles of strands occur which will exaggerate the angular appearance of the sheet.

The fact that most of the strands do run in a direction generally transverse the sheet is clearly apparent when a sheet is bent or flexed. It will be found that if one flexes the sheet along a line parallel with the main axis of the sheet (that is parallel with the direction of travel during expansion), it will take very much more energy to deflect the sheet than if it is flexed transverse the sheet. Ordinarily this differential will be such that it will demand more than twice as much energy to flex it a given distance along the line of the axis as to flex it across the axis.

This characteristic of our sheet of having the major portion of the strands so arranged that their average gives a sheet of definite grain is extremely important in the formation of battery separators for electric storage batteries, which is one of the valuable uses to which our invention can be put.

A proper battery separator must perform two functions which are more or less in conflict with each other. The separator is placed between the positive and negative plates in a battery and it must serve to prevent lead or lead-like "trees" from building up between the negative and positive plates, to form a short circuit. To accomplish this end the separator must have a definite filtering action and be free of channels large enough to permit the flow of particles from one plate to another.

While the primary function of the separator is thus to prevent treeing, the separator must be so constructed that it does not prevent ready flow of acid within the battery. The acid should be capable of moving freely between the two plates in order to get the proper electrical discharge, and also it has been found necessary to permit a vertical flow of the acid within the battery. This is particularly important in cold starting. Under such conditions a heavy discharge is needed and unless vertical movement of the acid as well as direct movement between the plates is permitted, localized areas are created where the battery no longer functions efficiently. In wood and rubber separators such as have heretofore been used, the vertical movement of the acid has been provided for by forming channels in the face of the separator.

We find that by the invention of this application we are able to make battery separators of extreme efficiency which have a sufficient filtering action so that treeing is not a problem under ordinary use of the battery, as in an automobile, and the porosity both through the sheet and transverse the sheet in the direction of the "grain" is sufficient to meet the battery requirements.

To accomplish these results we must keep within certain limits on many of the variables which our process permits.

The diameter of the glass fiber selected for use in our process will be of importance because the smaller the diameter the higher will be the concentration of glass. If glass having an average diameter of over .0007 inch is used the interstices will come so large that there is danger of treeing. On the other hand, if the glass is finer than .000025-inch, the mass will not have sufficient porosity. We prefer to use a glass fiber averaging between .0003 and .0006 inch in diameter.

The thickness of the sheet for separator purposes ordinarily should range between .030 and .200 inch. When fiber of the specified diameter is expanded to give sheets of such a thickness, it will be found that the sheet will contain between approximately 5% to 20% of glass as compared with its apparent volume.

The binder should range between 5% and 70% of the weight of the entire sheet, and ordinarily for separators it should fall between 30% and 60% of such weight. In general when the finer glass fiber is employed so that the glass concentration in the sheet is higher, the percentage of resin will be toward the lower end. Taking these factors into account and also the factor that the resin has a specific gravity lower than that of glass, we have found that the sheet should have between 40% and 8% by volume of solids, with the residue voids. In other words, the sheet should have between 60% and 92% porosity and in most cases this porosity should be between 75% and 90%.

Battery separators having these characteristics with the glass arranged so as to give a "grain" and with the binder applied in excess and with the excess blown out so that the films between the fibers are broken, are found to be extremely efficient.

To make such a separator it is only necessary to cut the sheet shown in the drawing to approximate size—for example to the dimensions of approximately 5¾ inches by 6 inches and arrange it in the battery with the "direction of travel" as shown in the drawing running horizontal in the battery. It is obvious that as these separators are cut from a large sheet made from relatively long fiber, the major proportion of the fibers in the separator will have a length at least equal to the smaller lateral dimension. Battery separators preferably use a water-insoluble binder such as a synthetic resin. Phenol-formaldehyde resins serve excellently for this purpose.

What we claim is:

1. A battery separator member consisting of matted glass fibers the larger proportion of which have a length at least equal to the smaller lateral dimension of the separator, such fibers being bonded together with a water-insoluble organic plastic material of the type used for bonding glass fibers connecting fibers at points of contact, but such separator being sufficiently free of films filling spaces between the fibers so that the separator has a porosity of between 60% and 92%, and a majority of the fibers of such separator crossing each other in generally diagonal directions but positioned more nearly parallel to one main axis of the separator than to the other axis so that the separator offers at least twice as much resistance when flexed on one transverse axis as when flexed on the other transverse axis.

2. A separator as specified in claim 1 in which the binder constitutes between 30% and 60% by weight of the whole.

3. A battery separator member consisting of a sheet of entangled glass fibers of a diameter between .000025 inch and .007 inch, the majority of the fibers having a length at least equal to the shorter lateral dimension of the sheet and crossing each other in generally diagonal directions but positioned more nearly parallel to one main axis of the separator than to the other axis so as to give sufficient grain to the sheet so that it has at least twice as much resistance to flexing when bent about one transverse axis as when bent about the other such axis and bonded together with a water-insoluble organic plastic material of the type used for bonding glass fibers of which the excess has been blown out to render the sheet highly permeable and to leave between 20% and 60% of binder in the sheet based on the weight of the entire sheet, such sheet having a thickness of between .030 inch and .200 inch and having a porosity of between 60% and 92%.

4. A bonded sheet of interlocked glass fibers, such sheet being of a size adapted for use as a battery separator member and having its fibers bonded together with a substantially water-insoluble organic plastic material of the type used for bonding glass fibers in an amount equal to between 5% and 70% by weight of the entire sheet and having a majority of such fibers crossing each other in generally diagonal directions but positioned more nearly parallel to one main axis of the sheet than to the other axis to give the sheet an appreciable "grain."

5. A sheet as specified in claim 4 in which the fibers are largely arranged in diagonally disposed groups or bundles.

JEREMIAH D. GILES.
ROY J. SCOTT.

REFERENCES CITED

The following references are of record in the file of this patent:

UNITED STATES PATENTS

| Number | Name | Date |
|---|---|---|
| 1,206,983 | Bliss | Dec. 5, 1916 |
| 2,015,006 | Ekisler | Sept. 17, 1935 |
| 2,117,371 | Slayter | May 17, 1938 |
| 2,454,100 | Slayter | Nov. 16, 1948 |
| 2,457,784 | Slayter | Dec. 28, 1948 |
| 2,477,555 | Roberts et al. | July 26, 1949 |

FOREIGN PATENTS

| Number | Country | Date |
|---|---|---|
| 602,520 | Great Britain | May 28, 1948 |
| 804,677 | France | Oct. 29, 1936 |
| 875,272 | France | Sept. 14, 1942 |